Patented Sept. 4, 1945

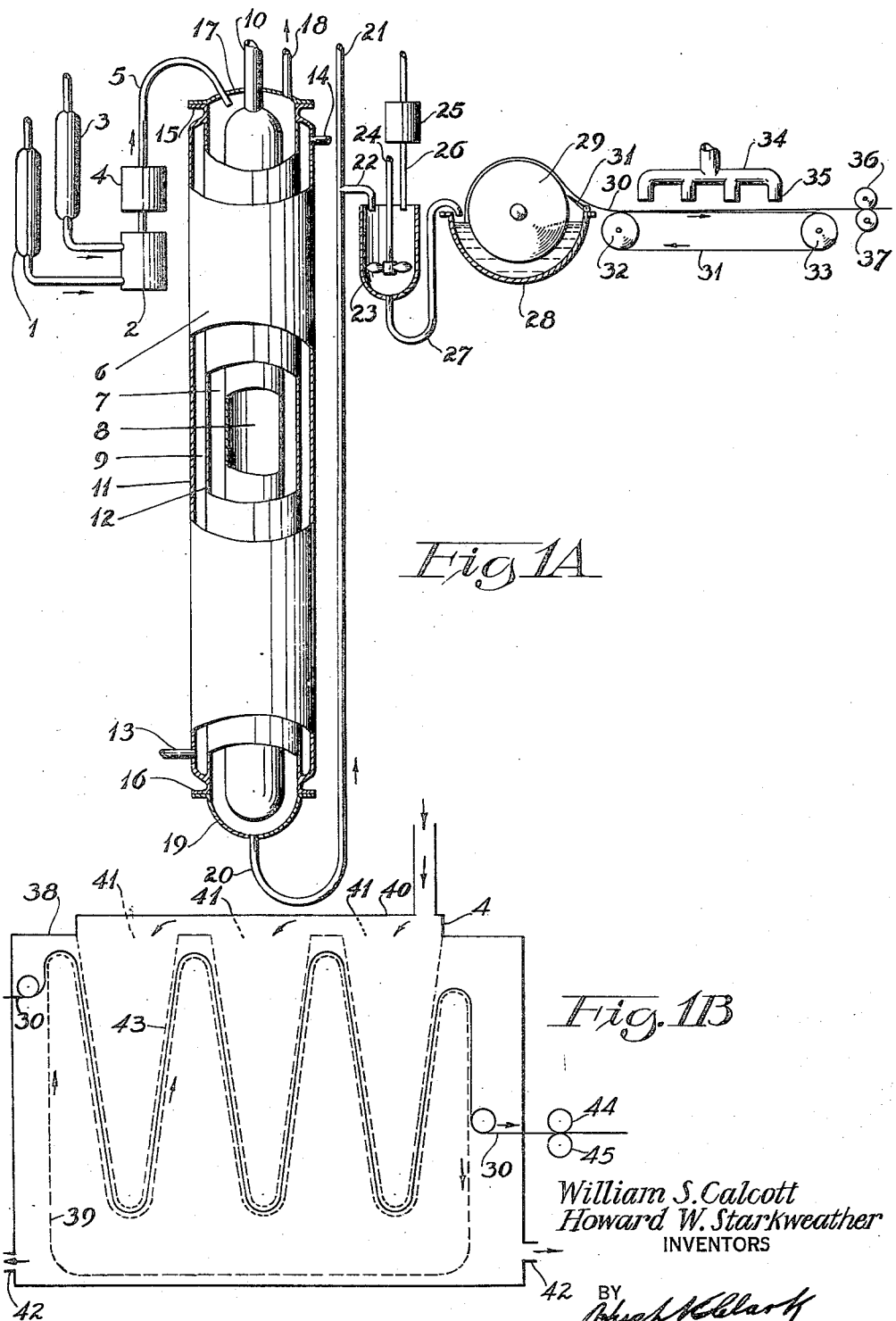

2,384,277

UNITED STATES PATENT OFFICE 2,384,277

CONTINUOUS PROCESS FOR MAKING RUBBER-LIKE MATERIALS BY POLYMERIZING ELASTOGENIC POLYMERIZABLE MATERIALS

William S. Calcott, Woodstown, N. J., and Howard Warner Starkweather, Wilmington, Del., assignors to E. I. du Pont de Nemours & Company, Wilmington, Del., a corporation of Delaware Application December 9, 1939, Serial No. 308,387

6 Claims. (Cl. 18—47.5)

This invention relates to the manufacture of synthetic rubber, and, more particularly, to a completely continuous process for the manufacture of synthetic rubber-like materials, particularly the polymers of chloroprene and of the butadiene hydrocarbons.

This application is a continuation-in-part of applicants' copending application Serial No. 107,332, filed October 24, 1936. This application has now matured into U. S. Patent No. 2,187,146, patented January 16, 1940.

Separate steps for the manufacture of rubber-like polymers of chloroprene, starting with acetylene, have been disclosed and claimed in a series of U. S. patents and patent applications. Another patent series covers the separate steps in the manufacture of rubber-like products from the butadiene hydrocarbons. In only a few cases, however, have continuous methods for carrying out these separate steps been disclosed. Furthermore, these various separate steps have not been combined into a single completely continuous process.

An object of the present invention is to manufacture rubber-like materials by a completely continuous process. A further object is to carry out the separate steps in a continuous manner and to combine these into a continuous and coordinated whole. Other objects will appear hereinafter.

It has been found that these objects are accomplished by continuously emulsifying an elastogenic, polymerizable material as manufactured by a continuous process in water containing a suitable emulsifying agent, continuously polymerizing this emulsion, continuously coagulating the resulting dispersion of polymer, and continuously washing and drying this coagulum, and then continuously preparing the polymer for shipment and use, the necessary agents for bringing about or accelerating these steps and for other purposes being continuously added at appropriate points in the process. "Elastogenic," as used throughout this application, means capable of forming rubber-like materials.

In the drawing, Figs. 1—A and 1—B are elevations, partly in section, of apparatus suitable for carrying out the process herein described.

In order that the invention may be more fully understood, a continuous process and apparatus therefor will be described in detail with reference to chloro-2-butadiene-1,3 (chloroprene) as a preferred specific embodiment of the invention.

Figs. 1—A and 1—B of the drawing represent a diagrammatic elevation of apparatus which may be used in the preferred form of the invention. The drawing is not to scale, and parts of the apparatus are broken away and shown in section in order to more fully illustrate the invention. The unpolymerized chloroprene which is preferably made by a continuous process is purified in a continuous still and then passed immediately to the apparatus shown in the drawing. Referring now more particularly to Fig. 1—A, the chloroprene is passed into tube 1 which is loosely packed with sulfur. This tube is maintained at a temperature such that the solution of sulfur in chloroprene issuing therefrom contains the desired proportion of sulfur. This solution from tube 1 passes through a proportioning pump 2 in which it is mixed in the desired proportions with an emulsifying solution which is delivered to pump 2 from reservoir 3. This mixture is then passed by the proportioning pump 2 through turbulent flow tube 4 where it is converted into an emulsion. The emulsion, leaving turbulent flow tube 4, passes through delivery tube 5 into polymerizing apparatus 6. This apparatus comprises an annular polymerizing chamber 7, an inner heat exchange chamber 8, and an outer heat exchange chamber 9. The temperature in the inner heat exchange chamber 8 is controlled by a suitable heat exchange medium introduced through the upper portion 10 thereof. For example, a fluid heat exchange medium, such as water, may be circulated through chamber 8 by means of suitable entrance and exit tubes (not shown), passing into and out of element 8 through 10 in a conventional manner. A suitable fluid heat exchange medium, such as water, is circulated between outer wall 11 and inner wall 12 of outer heat exchange chamber 9. Such fluid may be introduced through inlet 13 and discharged through outlet 14. Although inner heat exchange chamber 8 and outer heat exchange chamber 9 have been shown as continuous, either or both of these chambers may be subdivided into two or more zones, each of which is supplied with a heat exchange medium of suitable temperature, thereby maintaining different temperatures in different regions of polymerization chamber 7. Outer and inner walls 11 and 12 of outer heat exchange chamber 9 merge and form flanges 15 and 16 at the top and bottom respectively of said chamber. Removable cover plate 17 is attached to flange 15 by any suitable means to obtain a tight connection. Delivery tube 5 and upper portion 10 of inner heat exchange chamber 8 both pass through cover plate 17. Cover plate 17 is also provided with vent 18.

Bottom plate 19 is removably attached to lower flange 16 and is provided with an opening connected to discharge tube 20. The chloroprene emulsion entering polymerization chamber 7 through delivery tube 5 passes slowly downwardly in non-turbulent motion through the polymerization chamber whereby mixing is largely avoided since the density of the dispersion of polymerizing chloroprene increases continuously as the polymerization proceeds. A dispersion of chloroprene polymer leaves the bottom of the polymerization zone through discharge tube 20. This tube is vented at its upper end 21 and delivers the chloroprene polymer dispersion through overflow pipe 22 to mixer 23. This overflow pipe 22 is so positioned as to maintain a column of polymerizing material in polymerization chamber 7. Mixing chamber 23 is provided with an agitator 24. Through pump 25 and delivery tube 26, modifying materials such, for example, as plasticizing agents, are introduced into the chloroprene polymer dispersion and mixed therewith by agitator 24. Pump 25 is coordinated with pump 2 so as to maintain the rate of addition of modifying agents into chamber 23 so that a definite proportion of ingredients is obtained. This treated dispersion flows through syphon 27 into reservoir 28 in which an internally cooled drum 29 is rotated by suitable means not shown. A film 30 of the dispersion is frozen on the drum 29 and is conveyed from the unfrozen dispersion in 28 by the rotation of the drum. The rate at which the frozen dispersion leaves reservoir 28 is equivalent to the inflow of dispersion through syphon 27. The frozen film 30 is removed from the drum by knife 31 after having remained in contact with the cold surface for a time at least long enough for complete coagulation. The detached continuous frozen film 30 is then received upon an endless belt 31 which may be of any suitable material, such as woven wire or porous cloth. This belt is rotated on rollers 32 and 33 by a suitable means (not shown) at the same rate at which the film 30 leaves drum 29. Film 30 on belt 31 passes under spraying device 34 where it is sprayed with warm water or other washing medium issuing from nozzles 35. The frozen film is, thus, thawed and the resulting continuous film of coagulum is freed from soluble material. If desired, the washing may be facilitated by applying suction below the belt 31 carrying film 30 by conventional means not shown. The washed film now passes through rollers 36 and 37 which squeeze out the excess water.

Referring now more particularly to Fig. 1—B, film 30 passes into drying chamber 38 and on to conveyer 39 which may be of any suitable material such as a series of parallel slats made of metal or of a non-porous wood. This conveyer is driven by suitable means (not shown), such as parallel chains driven by sprockets at a rate which is coordinated with the previous rate of travel with film 30. Warm air is introduced into the drying chamber from manifold 40, through openings 41, and passes out of the chamber through suitable outlet vents 42. Apertured walls 43 direct the current of warm air against the film 30 traveling on belt 39. Dried film 30, upon leaving the drying chamber, is formed into a compact rope by being drawn through a series of guides into a narrow groove formed by the contact of concave edges of two rotating wheels 44 and 45. If desired, these wheels may also be used to emboss designs or identifying marks upon the rope. This rope of the finished product may be continuously wound upon spools or cut in short lengths and packaged for storage or shipment.

The continuous emulsification may be carried out in a variety of ways, all of which depend upon rapid agitation of the two phases. A preferred method is to pass the aqueous and non-aqueous phases through a so-called turbulent flow tube; that is, a tube of such diameter that the liquid passing through it acquires a turbulent motion instead of an even continuous flow. Another preferred emulsifying device is to pass the liquid through a centrifugal pump or colloid mill. Other devices for securing agitation may also be used, such as arrangements of stirrers, paddles, etc. Emulsification may also be brought about by passing the liquid through very fine openings, as in the so-called homogenizers. When one passage through an emulsifying device is insufficient to obtain the desired degree of emulsification, the partly formed emulsion from the first passage may be passed into a reservoir from which any desired proportion of the material is returned for recirculation through the emulsifying system, while another part, consisting of material which has passed more than once through the emulsifying equipment, is delivered to the polymerizing apparatus. By varying the proportion of material recirculated, any desired extent of emulsifying action may be obtained. Alternatively, one or more emulsifying devices may be used in series. In some cases, the emulsification takes place so readily that merely the agitation incidental to the initial mixing of the two liquids and their passage to the polymerization apparatus is sufficient to cause adequate emulsification.

Polymerization may be brought about by continuously passing the dispersed polymerizable material through a chamber maintained at a suitable temperature and of such size that the polymerizable material is polymerized to the desired degree by passage therethrough. It is desirable, but in many cases not essential, to prevent dispersions of the polymerizable material at a given stage of polymerization from mixing with dispersions at either an earlier or a later stage of polymerization. This may be accomplished as described in applicants' copending application, Serial No. 308,386, filed December 9, 1939, by a polymerization chamber consisting for example of a long narrow tubing or series of tubes, a vessel with suitably arranged baffle plates, or a tube of larger diameter filled with a packing material such as is used in absorption towers and fractionating columns. Preferably, however, the polymerization vessel consists of an unpacked tube or tubes or annular space of relatively large cross-section relative to its length through which the polymerizing dispersion passes downward and in which mixing of layers at different levels is prevented by taking advantage of the fact that the dispersion of the polymerizing material becomes progressively denser as the polymerization proceeds. As mentioned above, it is not essential, however, that the material at various stages of polymerization be prevented from mixing. Thus, in some cases, we may use, as the polymerization apparatus, a kettle into which the emulsion of the unpolymerized material is slowly fed and from which the dispersion is continuously withdrawn at another point. By proper agitation and proper selection of the rate at which material is added to and withdrawn from the kettle, substantially complete polymerization may be obtained by the use of this very simple apparatus.

Another method effective for continuous polymerization is to carry out successive stages thereof in separate vessels provided with agitation. Thus, although mixing of material in slightly different stages of polymerization does take place, mixing of widely different stages is prevented. The range of stages mixed may be narrowed to any desired extent by increasing the number of vessels. A polymerization system of this kind may be readily constructed with ordinary jacketed and agitated kettles, connected with syphons or arranged so that each overflows into the next. Provided that only a small number of kettles are required to avoid mixing to the desired extent, such a system is simple and very readily cleaned and inspected. The single polymerization vessels may be of the same or different sizes and may be operated at the same or different temperatures.

Another type of continuous polymerization is disclosed in U. S. Patent No. 2,161,481 in which the dispersion is passed through a long tube of such diameter that turbulence is set up.

A preferred method for continuous coagulation of the dispersion of rubber-like material has already been described in a copending application of Calcott and Starkweather, Serial No. 107,332, filed October 24, 1936. This consists essentially of freezing a thin layer of the dispersion on a rotating drum which is internally cooled, allowing the thin layer to remain in contact with the freezing surface for a length of time such that, on removing the film from the drum and allowing the ice therein to melt, a completely coagulated continuous sheet remains. The dispersion may be applied either by partly immersing the rotating drum therein or by spraying, dropping, or spreading it upon the drum.

Alternatively, the dispersion may be continuously coagulated by chemical means, for example, by being fed continuously along with a continuous stream of a liquid coagulating agent, into a cylinder which contains a closely fitting, rotating worm which extrudes the resulting coagulum through openings in the other end of the cylinder. The coagulum issuing from these holes is then cut into small pieces by a rotating knife. The coagulum may then be washed and dried on a continuous belt or by other means described below. Suitable coagulating agents for the various types of dispersion are already well known in the art. A variant of the above method consists of extruding the latex through narrow apertures into a coagulating bath as disclosed in British Patent 393,172, collecting the resulting strands and washing and drying them like the continuous sheet above.

Coagulation may be brought about electrically in various ways (see U. S. Patent No. 2,109,968) for example, by the use of apparatus very similar to the apparatus for coagulation by freezing in Fig. 1—A, a difference of potential being maintained between the walls of the reservoir 28 (or other electrode in contact with the latex) and the drum 29. The direction of the field is chosen so that the charged latex particles are deposited on the drum as a continuous film. As the drum rotates, the film is removed by the knife, washed and dried exactly as when coagulated by freezing. If uncoagulated latex adheres to the coagulated film after it is removed from the bath, it may be removed by applying gentle pressure with a roller and returned to the reservoir.

Another method of forming a continuous sheet or ribbon of coagulum suitable for washing and drying may be applied in those cases where it is possible to bring about delayed coagulation of the dispersion. In these cases, the sensitized dispersion is applied to a rotating drum or a moving belt from which it is removed after the coagulation has taken place.

Another type of continuous reduction of the aqueous dispersion to solid form consists of evaporating the water, for example, by atomising the dispersion in a large volume of hot air so that the water is substantially all removed and thereafter separating the powder by one of the many well-known mechanical devices which have been developed for carrying out this type of operation. Another method of removing the water phase by evaporation consists of applying the dispersion, for example, by spraying or spreading, to a heated rotating drum or heated moving continuous strip, removing the water vapor for example by a current of air, and then removing the dried film from the support.

In many cases, by a suitable choice of coagulating agents such as are known in the art, it is possible to precipitate the rubber-like material from its dispersion in the form of a more or less finely divided or crumb-like precipitate rather than as a continuous coagulum. In such cases, the dispersion and coagulating agent may be fed continuously into one end of a trough, tube, or similar vessel and the suspension of precipitated material continuously withdrawn at the other. This suspension may be conveniently washed and dried by a number of means well known in the art, such as the use of continuous vacuum filters. The agents used for washing may be water or an organic solvent such as alcohol or acetone which dissolves the materials which it is desired to remove but which does not dissolve the polymer. When the solvent material removed by washing (such as, for example, the unpolymerized portion of the polymerizable material or the emulsifying agent) is to be recovered, the washings from the coagulum can be subjected to a continuous distillation from which the recovered solvent is continuously returned to the washing apparatus and the polymerizable material or emulsifying agent, for example, are continuously returned to that part of the continuous operation in which they are used. The washing agents may be applied by spraying, for example, or the film or other object to be washed may be passed through a bath of the agent, which is continuously renewed.

The washed coagulum is particularly easily dried when it is in the form of a thin continuous sheet. Thus, it may be transported on a moving belt or other conveyor through ovens or drying chambers in which it is dried by a current of warm air. A particularly efficient and compact form of continuous drying apparatus is shown in Fig. 1 and described above. Alternatively, the film may be passed through a drying tunnel in which a current of warm air moves in the opposite direction or any other method used for drying continuous sheets (for example, paper) may be applied. The drying of the continuous sheets may also be brought about by passing them over heated rolls or drums. When the rubber-like material is obtained in the form of a powdery or crumb-like precipitate, it may be continuously dried by the well-known methods.

If the rubber-like material is to be milled before shipment, this may be done continuously in several ways. For example, the polymer may be delivered continuously to one end of a rubber mill and continuously removed at the other end after having passed repeatedly between the rolls, in a manner similar to that used for natural rubber on a so-called warm-up mill. The desired amount of milling may be secured by the proper adjustment of the setting and temperature of the mill and the speed of addition and withdrawal of the material. Alternatively, the washed and dried polymer in the form of a continuous sheet or thread or as a precipitate may be delivered continuously into a tubing machine or into a series of several tubing machines. The number of tubing machines and their speed temperature and type of die may be adjusted so that the desired amount of milling is obtained. A modified form of tubing machine designed for plasticizing natural rubber and known as a "Gordon plasticator" may be used to advantage. Another device for continuous milling consists of a series of rolls arranged in a bank with alternate rolls rotating in the same direction as in a rubber calender. The material to be milled may be delivered continuously to the first roll of this apparatus and removed continuously from the last after having undergone the desired amount of milling.

The rubber-like material may finally be continuously prepared for storage or shipment by various methods. Thus, the continuous sheet coming directly from the washing and drying operations or from one of the milling devices described above may be drawn through a system of guides and finally compressed into a continuous rope which may either be coiled or wound upon spools or cut into short lengths for final packaging. If the material is milled by the first method given above by passage through tubing machines, it will already be in such a rope-like form. Alternatively, the continuous sheet may be doubled back and forth and finally compressed into slabs or may be rolled upon drums and finally removed in the form of slightly curved blocks or else wound into solid cylinders which may be shipped as such or after cutting into smaller pieces. When in the form of a rope, the material may be readily and continuously transported from one part of the plant to another without the need of any conveying equipment, other than a simple system of pulleys. When the polymer is obtained in more finely divided form, it often may be conveniently compressed into blocks for shipment. If the material, at this stage, is somewhat tacky, it may be continuously dusted with talc, starch, or similar materials by continuous passage through a layer of talc or through chambers in which the talc is kept suspended by an agitating device.

As discussed above, various agents may be added continuously at various points in the continuous process. These agents may be added for modifying, catalyzing, or inhibiting the polymerization, for stabilizing, plasticizing, and compounding the polymers and for other purposes. They may be added to the aqueous dispersing agent or to the polymerizable substances before or during emulsification, or to the emulsion before, during, or after its polymerization, or to the film, coagulum, or finely divided precipitate during or after drying or to the polymer during milling. They may be added in liquid form (solutions, aqueous dispersions, or as the liquid itself) and may be added either to a liquid or to a solid taking part in the continuous process as, for example, to the continuous sheet of coagulated polymer (in which case they may be added by spreading, spraying, etc.). Solids may be added continuously to a liquid in the continuous process. For example, sulfur may be dissolved by passing the chloroprene at constant temperature through a column loosely packed with sulfur and long enough to obtain saturation. The desired concentration of sulfur may thus be secured by adjustment of the temperature. Solids may be conveniently added to solids passing through the continuous process, for example, by sifting from above upon a horizontal surface upon the continuous sheet of coagulated polymer. Gases may be introduced into liquids by any of the known methods, for example, by passing the gas into the liquid through a material such as unglazed porcelain so as to form very small bubbles. An example of such an addition is the treatment of chloroprene with air, oxygen, or ozonized air in order to catalyze the polymerization. Solids may also be treated with gases. For example, a continuous sheet of coagulated chloroprene polymer which has been polymerized in the presence of sulfur and which contains a compound such as tetramethyl thiuram disulfide may be plasticized by passage through an atmosphere containing ammonia, followed by suitable milling treatment.

In the addition of most of the reagents referred to above at various stages of the continuous process, it is essential that they be added at a definite and constant rate. This is in general accomplished by the use of known devices for delivering gases, liquids, and solids at fixed, constant rates, such as valves or hydraulic devices which supply a fluid to an orfice at constant pressure, constant speed pumps, and automatic weighing machines. When these are actuated by a continuously moving mechanism, this mechanism may, in turn, be actuated by the mechanism which controls the passage of the material which is to be treated. Thus, the dispersions or solutions of reagents which are used for the further processing or modification of the polymer may be added through a pump operating on the same shaft with the pump which supplies the emulsion to the polymerization apparatus and geared so as to deliver the required proportion of reagents. The required proportion of reagent in liquid form may also be added by passing them together with the liquid to be treated through a proportioning pump.

When streams of two liquids are brought together, it is usually desirable to cause their thorough mixing before the next step of the continuous process is reached. Two ways of accomplishing this are to pass the combined streams through a tube in which turbulence is set up or to pass the two streams into a vessel in which they are thoroughly mixed by suitable agitation and from which the mixture is continuously withdrawn, for example by an overflow device.

As discussed above in connection with the addition of agents at various stages of the continuous process, it is desirable to coordinate all of the continuous operations. The proportioning pump which measures the aqueous and non-aqueous components of the emulsion and delivers them to the emulsifying and polymerizing equipment should be coordinated not only with the pump which delivers the various liquids with which the polymerized latex is treated, but also with the rotating refrigerated drum or other device used for coagulating the latex, with the various rolls and belts used for washing and drying the coagulated latex, with devices for continuously milling the polymer and preparing it for shipment, and with all devices by which constant proportions of reagents are added. In this way, the materials may be made to pass steadily through the entire process without accumulation at any intermediate points. This may be accomplished either by having all the pieces of equipment driven by the same shaft or by operating each at a uniform, predetermined speed. The coordination of the various operations should be flexible enough, however, to allow individual operations to be advanced or retarded, for example, by changing a gear ratio, if such a change becomes necessary.

The uniformity of operation may be checked at appropriate points by thermometers, flow meters, hydrogen ion concentration recorders, etc., all of which may be equipped so as to form a continuous record. Several other quantities are important in following the operation of the process. Thus. the density of the finished latex is an indication of the completeness of the polymerization. The thickness of the coagulated film of polymer is an indication of the functioning of the coagulating device and affects the ease of washing and drying the film. The power consumption of the milling equipment, taken in connection with the temperature of the material being milled, is a measure of the plasticity of the polymer, more plastic material requiring less power at a given temperature. Thus, changes in the operation of the equipment or in the characteristics of the material being processed are indicated at once by the various control instruments. The fault may then be corrected by correction of the factor responsible or by adjustment of the rates of the various coordinated operations as described above. Thus, for example, if it is shown by the wattmeter on the milling equipment that the polymer is less plastic than desired, this may be adjusted by suitably increasing the rate at which the plasticizing agent is added.

The continuous process of this invention is applicable to elastogenic, polymerizable materials. The preferred materials are elastogenic dienes such as chloroprene, bromoprene, butadiene, isoprene, chloro-2-methyl-3-butadiene-1,3. Chloroprene is especially preferred.

One important advantage of this invention is that it avoids the necessity of storing any of the intermediate products of the process. When batch operation is used, on the other hand, material resulting from each separate step must be accumulated until enough is available for the next operation. Since these intermediate materials are in most cases unstable, batch operation requires not only that large storage vessels be provided, but also that these be refrigerated or otherwise protected. In cases where long storage is necessary, the material must be stabilized with a stabilizing agent which must be removed before the next operation. The use of the continuous process described above causes savings in equipment, materials (stabilizers), power (refrigeration), and simplicity of operation.

In some cases, it is possible, by careful organization, to operate the various discontinuous steps of the batch process in such a way that the unstable intermediate products are held only a short time before the next step, and, hence, need not be stabilized. Nevertheless, some unavoidable, spontaneous alteration in the intermediate products takes place, and, since this is variable in amount, a variation of properties is introduced into the final product. The continuous process, since it eliminates these variable alterations, leads to a much more uniform product, and, hence, is a valuable improvement over the batch process, even when the latter is operated under the most favorable conditions.

Another important advantage arises from the entirely unexpected discovery that, when chloroprene polymer is made by this completely continuous process, antioxidants, which must ordinarily be added to prevent the alteration of the polymer during the various processing steps, become unnecessary. This is most surprising, in view of much greater surface per given weight of material exposed to air in case of the continuous as compared with batch operation. Even the latex cannot be stored in the absence of antioxidants without undergoing deleterious changes, but by this continuous process it is possible to produce dry, plastic polymers which can be compounded and cured to yield valuable articles of commerce even without the use of antioxidants. The absence of antioxidants removes the most important cause of discoloration of the polymer in use.

The process described above also furnishes a particularly advantageous method for packaging the polymer. Thus, the polymer in the form of ropes, sheets, threads, crumbs, powder, or any of the forms to which it may readily and continuously be reduced as described above may be easily and, in most cases, automatically packaged for shipment.

We claim:

1. A process for making a rubber-like material without incorporation therein of an antioxidant which comprises performing continuously and in uninterrupted succession the following steps: emulsifying an elastogenic polymerizable material, polymerizing the emulsified material until a predetermined density is reached, coagulating the resulting dispersion of polymer, and washing and drying the coagulum.

2. A process for making a rubber-like material without incorporation therein of an antioxidant which comprises performing continuously and in uninterrupted succession the following steps: emulsifying an elastogenic diene of the group consisting of chloroprene, bromoprene, butadiene, isoprene, and chloro-2-methyl-3-butadiene-1,3, polymerizing the emulsified material until a predetermined density is reached, coagulating the resulting dispersion of polymer, and washing and drying the coagulum.

3. A process for making a rubber-like material without incorporation therein of an antioxidant which comprises performing continuously and in uninterrupted succession the following steps: emulsifying chloroprene, polymerizing the emulsified chloroprene until a predetermined density is reached, coagulating the resulting dispersion of polymer, and washing and drying the coagulum.

4. A process for making a rubber-like material without incorporation therein of an antioxidant which comprises performing continuously and in uninterrupted succession the following steps: emulsifying an elastogenic polymerizable material in water containing an emulsifying agent by turbulent flow, polymerizing the emulsified material by slow downward flow while avoiding mixing until a predetermined density is reached, coagulating the resulting dispersion of polymer by freezing in a thin film, washing the coagulum to remove the ice and water-soluble materials and drying the coagulum.

5. A process for making a rubber-like material without incorporation therein of an antioxidant which comprises performing continuously and in uninterrupted succession the following steps: emulsifying an elastogenic diene of the group consisting of chloroprene, bromoprene, butadiene, isoprene, and chloro-2-methyl-3-butadiene-1,3 in water containing an emulsifying agent by turbulent flow, polymerizing the emulsified material by slow downward flow while avoiding mixing until a predetermined density is reached, coagulating the resulting dispersion of polymer by freezing in a thin film, washing the coagulum to remove the ice and water-soluble materials and drying the coagulum.

6. A process for making a rubber-like material without incorporation therein of an antioxidant which comprises performing continuously and in uninterrupted succession the following steps: emulsifying chloroprene in water containing an emulsifying agent by turbulent flow, polymerizing the emulsified material by slow downward flow while avoiding mixing until a predetermined density is reached, coagulating the resulting dispersion of polymer by freezing in a thin film, washing the coagulum to remove the ice and water-soluble materials and drying the coagulum.

WILLIAM S. CALCOTT.
HOWARD WARNER STARKWEATHER.